United States Patent [19]

Altman et al.

[11] 4,069,909
[45] Jan. 24, 1978

[54] FRUIT FEEDER

[76] Inventors: James E. Altman; Eston Altman, both of Gray, Ga. 31032

[21] Appl. No.: 777,963

[22] Filed: Mar. 16, 1977

[51] Int. Cl.² ............................................... B65G 47/12
[52] U.S. Cl. ................................... 198/446; 198/491; 198/531; 198/773
[58] Field of Search ............... 198/424, 432, 446, 459, 198/491, 526, 530, 531, 773, 774, 796; 221/93, 290, 299, 300, 301

[56] References Cited

U.S. PATENT DOCUMENTS

| 1,992,331 | 2/1935 | Smith | 198/773 |
|---|---|---|---|
| 2,081,441 | 5/1937 | Willshaw et al. | 221/300 |
| 2,908,375 | 10/1959 | Hoover et al. | 198/491 |
| 3,040,864 | 6/1962 | Belk | 198/478 |
| 3,509,988 | 5/1970 | Smith | 198/773 |
| 3,651,925 | 3/1972 | Green | 198/773 |
| 3,923,143 | 12/1975 | Green | 198/773 |

Primary Examiner—Evon C. Blunk
Assistant Examiner—Jeffrey V. Nase
Attorney, Agent, or Firm—Hill, Gross, Simpson, Van Santen, Steadman, Chiara & Simpson

[57] ABSTRACT

A fruit feeder adapted to elevate a plurality of fruit pieces along a diagonal pathway from a bottom position to a top position in a stair-step transfer arrangement. The feeder is operated by fluid cylinder and is adapted to deliver individual fruit members arranged in a row to continuously or discontinuously moving fruit holders located functionally adjacent the upper end portion of the fruit feeder.

17 Claims, 7 Drawing Figures

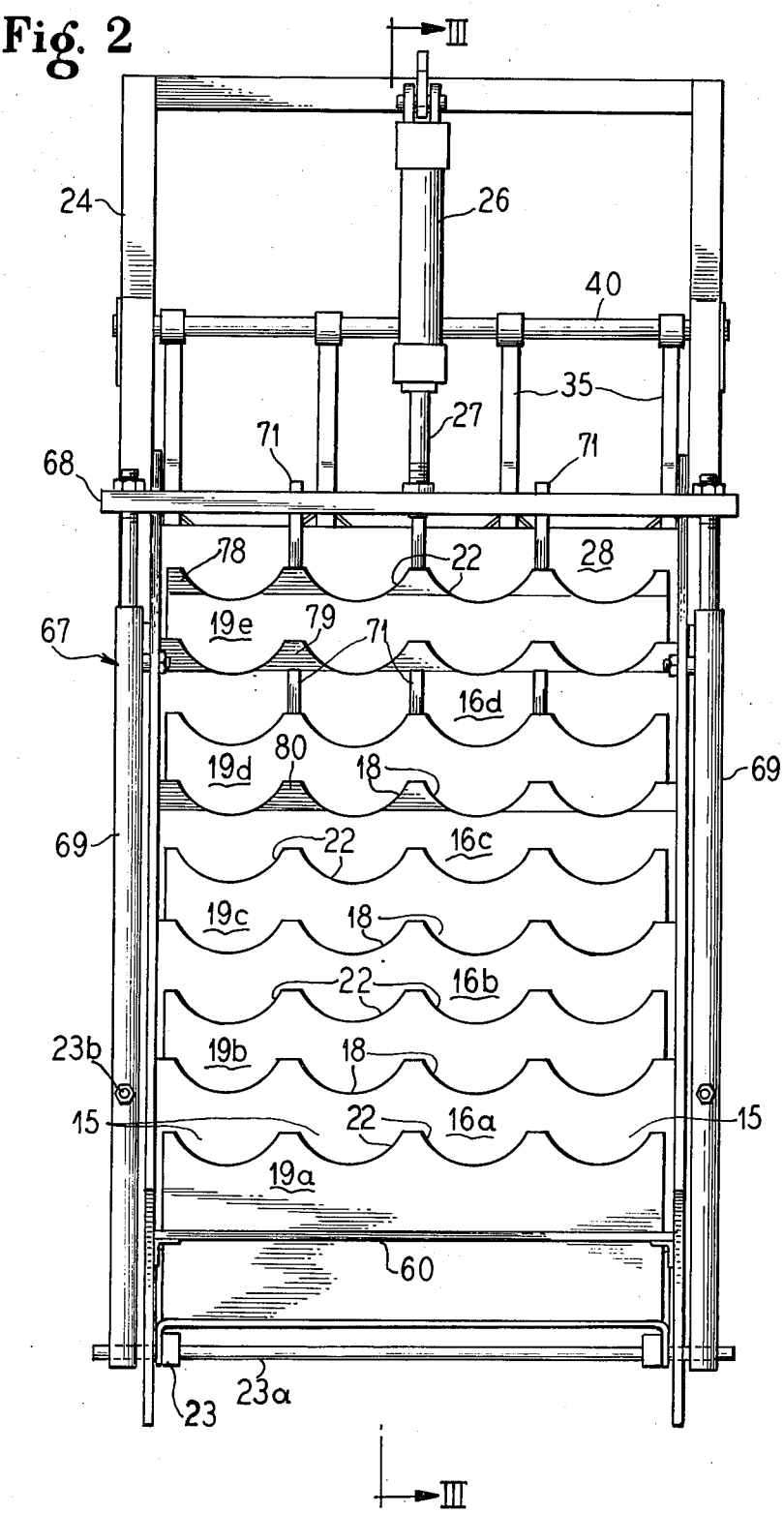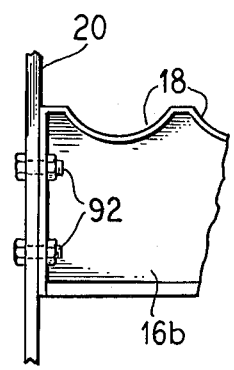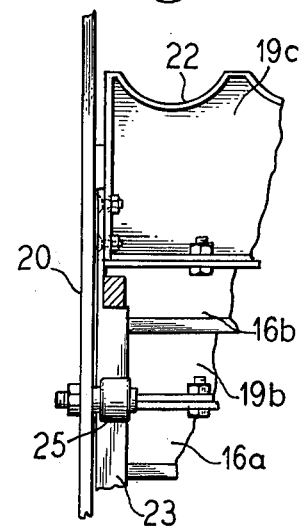

FRUIT FEEDER

BACKGROUND OF THE INVENTION

Fruit feeders have become necessary pieces of equipment in mechanized processing of fruit pieces, including such types of fruit as oranges, bell peppers, grapefruit, apples, and the like, as those skilled in the art will appreciate. Because of the desirability of having reliable, low maintenance, and relatively economical equipment, fabrication of fruit feeders adapted for synchronized automatic operation is an important and difficult aspect of food machinery construction and production.

Synchronizable, automatically feedable fruit feeders which employ entirely mechanical elements for power transfer are subject to the disadvantage that, should an equipment failure occur, such machinery typically tends to continue operation resulting in additional damage to equipment, and even break-up of certain subassemblies, so that excessive down time and high maintenance costs can become a serious matter in a food processing facility, particularly during a harvest season.

There is a need in the food processing field for relatively simple, reliable, long operating easily serviceable fruit feeder mechanisms which are adapted not only for synchronized, automatic operation, but also for use in combination with downstream food processing machinery.

BRIEF SUMMARY OF THE INVENTION

The present invention concerns a synchronizable, automatically operable fruit feeder which utilizes first and second fluid cylinder means and which is adapted to sequentially elevate and deliver simultaneously to a plurality of working stations arranged in a row individual fruit pieces. The fruit feeder operates continuously and is directly incorporatable as a subassembly into a fruit processing machine system adapted to process a large number of individual fruit pieces per hour. The invention overcomes the problems associated with prior art all-mechanical type fruit feeders, and provides a new, improved, highly efficient, reliable mechanism well suited for extended periods of operation with a minimum of down time and maintenance. The use of cylinder means in the manner provided in the present invention permits good control of machine operational sequences and affords a minimum of damage to machinery in the event of machine malfunction of any sort. Thus, as soon as prechosen machine operating parameters are exceeded, a fruit feeder machine of this invention can be adjusted so the cylinders cease normal operational functions, if desired, which prevents any appreciable machine damage and avoids subsequent excessive down time in repair.

The apparatus of the present invention characteristically employs a plurality of first shelf members in spaced, parallel, diagonal relationship to one another which are in a fixed spatial relationship, and also a plurality of second shelf members in spaced, parallel, diagonal relationship to one another which are each interdigitated between a different adjacent pair of each of said first shelf members. The second shelf members are adapted to move transversely and reciprocally relative to the first shelf members. The driving force is provided by the first fluid cylinder means.

After being elevated to a top positon by means of said such first and second pluralities of shelf members in stair-step fashion, a plurality of fruit pieces move by gravity down a raceway having defined therein a plurality of passageways, there being one passageway for each fruit member. The bottom of each passageway is closed by gate means which automatically raise and lower to release individual fruit members from each passageway, for example, for deposition onto working station, or otherwise, as desired. The individual gate means are raised and lowered by means of the second fluid cylinder means functionally associated therewith. Operational movements of the respective first and second cylinder means are controlled.

The automatic fruit feeder of the present invention is particularly well adapted for use in combination with machinery wherein fruit pieces are processed at a plurality of separate stations simultaneously and continuously by machinery having a stop and go movement.

Other and further objects, aims, features, advantages, purposes, applications and the like will be apparent to those skilled in the art from the present specification taken together with the accompanying drawings.

BRIEF DESCRIPTION OF DRAWINGS

In the drawings:

FIG. 2 is a plan view taken along the line II—II of FIG. 1;

FIG. 6 is a fragmentary sectional view taken along the line VI—VI of FIG. 3; and FIG. 7 is a fragmentary sectional view taken along the line VII—VII of FIG. 3.

DETAILED DESCRIPTION

Figure 1:
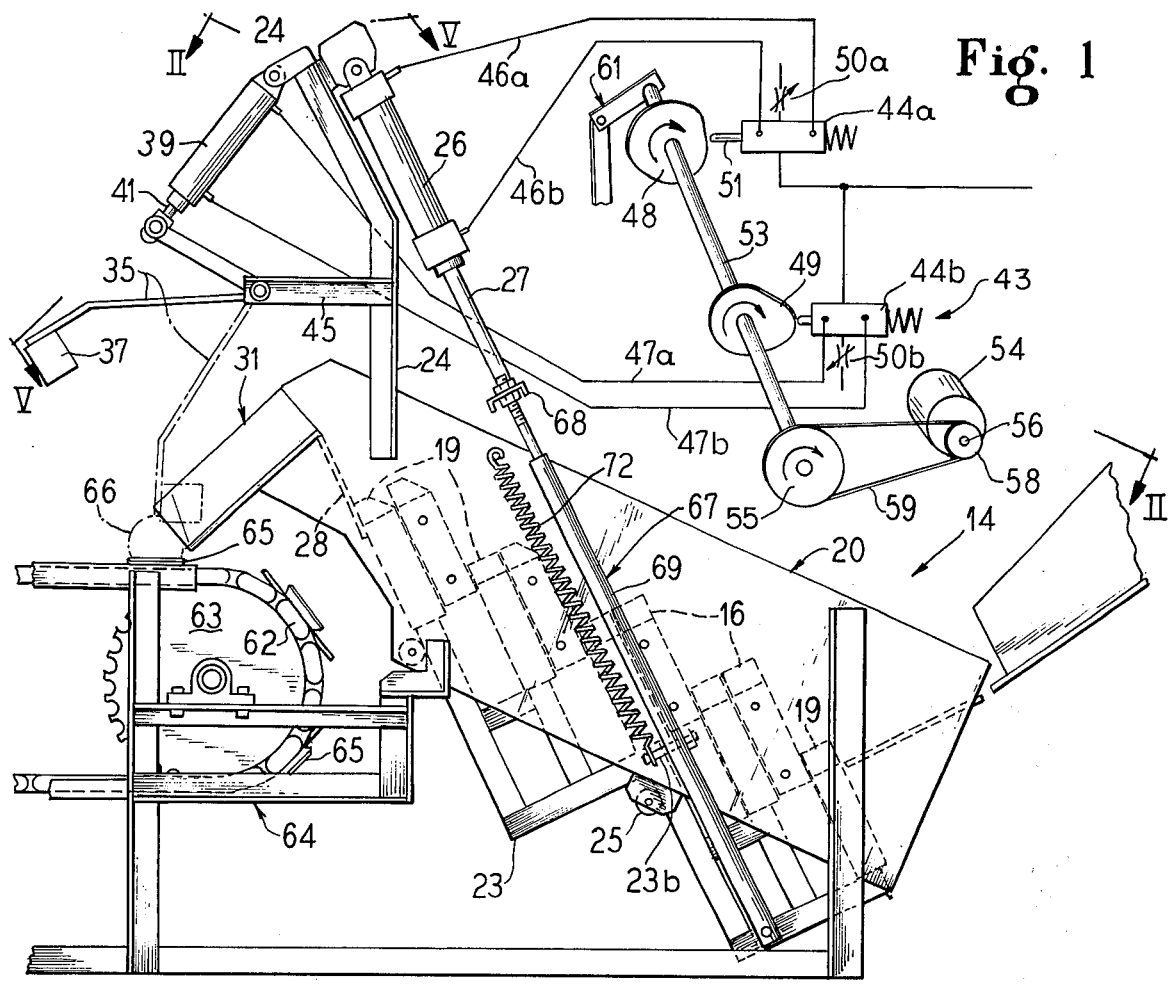
FIG. 1 is a side elevational view of one embodiment of the present invention including in schematic form a synchronizing arrangement for operating such embodiment.
Figure 5:
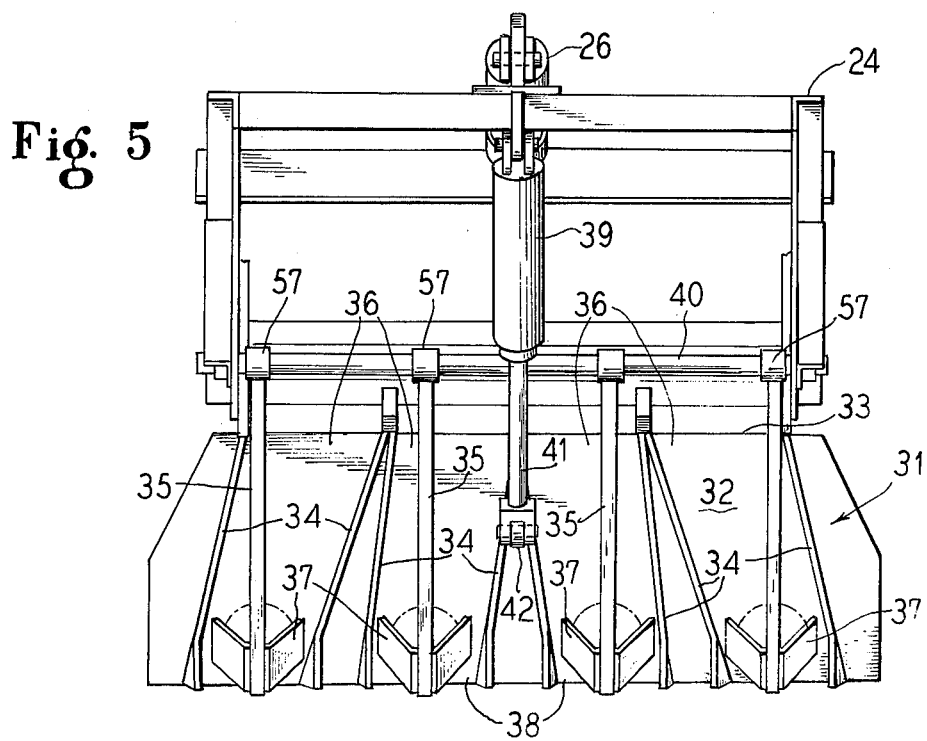
FIG. 5 is an elevational view taken along the line V—V of FIG. 1.

Referring to the drawings, there is seen an embodiment of a fruit feeder of this invention which is designated in its entirety by the numeral 14. Fruit feeder 14 incorporates a plurality of first shelf members 16 which are located in spaced, parallel relationship to one another. Each individual one of such first shelf members 16 is offset from adjacent such first shelf members 16 so that such first plurality defines a diagonal stair-step arrangement. The upper edge 17 of each one of such first shelf members 16 has defined therein a plurality of laterally adjacent first recesses 18. Such first recesses 18 are so arranged spatially on adjacent such first shelf members 16 that they define a plurality of longitudinally extending, laterally spaced, parallel rows 15 thereof.

A first stationary frame 20 is provided in fruit feeder 14 which fixedly holds each individual one of said first shelf members 16 in such spaced parallel, diagonal relationship as by bolting or other suitable means. Frame 20 is here constructed of plate stock and angle iron members welded and bolted together at locations of abutment or overlap. Any convenient construction for frame 20 can be employed.

Fruit feeder 14 further incorporates a plurality of second shelf members 19 which are located in spaced, parallel, diagonal relationship to one another. One of such second shelf members 19 is interdigitated between a different adjacent pair of said first shelf members, such as pairs 16a and 16b, 16b and 16c, 16c and 16d, etc. Also, one such second shelf member 19 is adjacent each respective side of the lowermost one 16a and also the uppermost one 16d of said plurality of first shelf members 16. The upper edge 21 of each one of such second shelf members 19 has defined therein a plurality of laterally adjacent second recesses 22. Such second recesses 22 are so arranged spatially on adjacent such second shelf members 19 that these recesses 22 are respectively aligned with such first recesses 18 in such plurality of rows 15. Each of such second shelf members 19 is slidably movable transversely relative to the first shelf members 16. The second shelf members 19 are constructed somewhat similarly to the first shelf members 16.

A second frame 23 is provided for fruit feeder 14 which fixedly holds each individual one of such second shelf members 19 in such relationship. This second frame 23 is reciprocatorily movable transversely relative to the first frame 20. Frame 23, is constructed of bar stock and angle iron members welded together at locations of abutment or overlap. Any convenient construction for frame 23 can be employed, but the second frame here employs to angle-irons on each side; the other elements thereof are strap members. Thus, second frame 23 is supported on first frame 20 by support rollers 25 which are mounted to first frame 20. Rollers 25 coact with the angle-irons of the second frame 23 to permit each one of the second shelf members 19 to move transversely and reciprocatorily an equal distance relative to first shelf members 16.

A support arrangement 24 generally upstands preferably in the region of the uppermost one 16d of the first shelf members 16. This support arrangement 24 is fixedly associated with the first frame 20. Support arrangement 24 here is comprised of a pair of posts, each one formed of angle-iron and secured by welding or the like to a different opposite side of first frame 20 so as to upstand therefrom.

A first fluid cylinder 26 is functionally associated with the support arrangement 24. Cylinder 26 is here preferably of the double acting pneumatic type and has an extensible and retractable first piston rod 27 which itself is terminably functionally associated with the second frame 23. The first rod 27 is adapted during operation of the first cylinder 26 to reciprocatorily move the second frame 23 to an extent sufficient to translate the upper edge 21 of each one of such interdigitated second shelf members 19 between upper and lower positions of general prechosen alignment with the respective adjacent upper edges 17 of the adjacent respective upper and lower first shelf members 16. While a preferred arrangement is employed in fruit holder 14, those skilled in the art will appreciate that any convenient first cylinder means can be employed, including pairs of pneumatic cylinders each one moving a different opposed side of frame 23 (not detailed).

A plate 28 is fixedly associated with the first frame 20 and is located slidably adjacent the back side 29 of the uppermost one 19e of the second shelf members 19. Plate 28 is secured to first frame 20 by bolting or the like.

A raceway designated in its entirety by the numeral 31 is utilized in fruit feeder 14 to channel and guide fruit pieces using gravity once they have passed over plate 28. Raceway 31 has a base plate 32 which is joined across its top edge 33 to plate 28, and base plate 32 is downwardly inclined therefrom. Raceway 31 includes a plurality upstanding, generally longitudinally extending wall members 34 defining therebetween a plurality of passageways 36 corresponding to, and aligned with, the individual rows 15, and the wall members 34 are generally aligned with respective side portions of rows 15 at top edge 33. Raceway 31 is secured to frame 20 by nut and bolt assemblies, welding, or the like, as desired.

A plurality of gates 37 are employed. Each gate 37 is disposable across the lower end region 38 of a different one of the passageways 36. Each gate is secured, by bolting or the like, to a separate arm member 35. A pivot shaft 40 extends laterally across and above raceway 31 and is on its opposed ends journaled for pivotal rotational movements by projections 45 on support arrangement 24. Each of the arm members 35 is fixedly joined at the gate-opposed end 57 thereof to shaft 40, the arm members 35 thus being in laterally spaced relationship to one another. Pivotal rotational movements of shaft 40 thus raises and lowers the gates 37 from and to the lower end regions 38 of the passageways 36. Any convenient mechanical means can be employed to simultaneously raise and lower all gates 37.

A second fluid cylinder 39 is functionally associated with said support arrangement 24. Cylinder 39 is here preferably of the double acting pneumatic type and has an extensible and retractable second piston rod 41 terminably functionally associated with the arm members 35. Here, a lever arm 42 is fixed at one end thereof to a central region of shaft 40 and at the other end thereof is pivotally connected to the terminal end portion of second piston rod 41. Thus, the second piston rod 41 is adapted, during operation of second fluid cylinder 39, to produce reciprocal raising and lowering of said plurality of gates 37 to, respectively, alternately open and close the lower end region 38 of each of said passageways 36. While a preferred arrangement is employed in fruit feeder 14, those skilled in the art will appreciate that any convenient cylinder means can be employed.

The fruit feeder 14 further includes synchronized automatic actuation means herein designated in its entirety by the numeral 43 for operating the first fluid cylinder 26 and the second fluid cylinder 39. The exact type and construction of actuation means 43 can vary unduly depending especially upon the type of fruit processing machinery with which a fruit feeder is to be employed. In fruit feeder 14, for example, such actuation means 43 includes a pair of cam actuatable fluid valves 44a and 44b. Pressure lines 46a and 46b, and 47a and 47b functionally interconnect each respective one of such valves 44a and 44b with a different one of such cylinders 26 and 39. Cams 48 and 49 are suitably functionally oriented and associated with the respective stems 51 and 52, of each valve 44a and 44b. Each stem 51 and 52 is normally outwardly biased and adapted by depression and release thereof, to control air flow from each of the valves 44a and 44b through lines 46a, 46b, 47a and 47b to double acting cylinders 26 and 39, thereby to reciprocably move the respective piston rods 27 and 41. The valving directs the air (gas) pressure to either one port or the other of a given pneumatic cylinder.

As a valve stem 51 or 52 is moved inwardly or outwardly relative to its valve body, air (gas) is directed to either one or the other port of the associated cylinder, to extend or retract the cylinder piston rods 27 and 41 in a synchronized and sequenced fashion in accordance with fruit feeder requirements.

Each cam 48 and 49 is axially mounted on a shaft 53. Shaft 53 has a drive wheel 55 rigidly mounted axially thereon. A motor 54 is provided which has a drive shaft 56 with a pulley 58 axially mounted thereon rigidly. A belt 59 continuously transfers power from motor 54 to shaft 53 thereby controlling operation of the cylinders 26 and 39 via cams 48 and 49. Shaft 53 also functionally interconnects with the stop and go conveyor crank linkage 61. Linkage 61 interconnects with the drive (not shown and not part of this invention) for sprocket 63 which drives the conveyor 62 in a food processing machine designated in its entirety by the numeral 64 (machine 64 is not part of this invention as such and is not detailed herein; such machines are generally known to the art). Conveyor 62 is here a continuous loop roller chain and has at regular, longitudinally spaced intervals theralong a plurality of laterally spaced fruit holders 65 which are each adapted to hold fruit pieces received thereinto from raceway 31 of fruit feeder 14. Conveyor 62 thus moves rows of fruit pieces 66 in fruit holders 65 through a station or stations in machine 64 where processing functions and operations are performed simultaneously on all fruit pieces 66 in a given row. Conveyor 62 moves on a stop and go basis, with the longitudinal movement of conveyor 62 ceasing at each machine station for an interval of time chosen to be long enough to permit a machine function to be performed there. By having the entire timing mechanism on a single shaft, all mechanisms are assured synchronous operation.

When cylinder 26 has fully retracted piston rod 27, fruit pieces are lifted over top edge 33 and move down raceway 31. At this time, gates 37 are typically in the closed position shown in FIG. 2 with rod 41 fully extended from cylinder 39. As cylinder 26 extends piston rod 27, cylinder 39 retracts piston rod 41 and raises gates 37 permitting fruit pieces to move into the waiting fruit holders 65.

After the conveyor 62 moves the fruit pieces 66 down stream, clear of the raceway 31, the rotating cam 49 causes the cylinder 39 to extend the piston 41 to again close the gates 37 in readiness to receive a subsequent row of fruit pieces 66. Variations in machine cycles and cycle times are achieved by altering cam lobe positions or cam 48 and 49 dimensions.

In operation of feeder 14, when the second frame 23 assembly is moved to its lowermost position, each of the individual second interdigitated shelf members 19 become aligned with a preceding (relative to the direction of forward movement of the fruit members) respective first shelf member 16.

The fruit feeder 14 preferably has a bin or storage hopper 60 formed here of sheet metal and having a bottom plate and integral side walls. Bin 60 is functionally associated with a said lowermost one 19a of said plurality of second shelf members 19. The bin 60 bottom plate is generally inclined downwardly towards said lowermost one 19a of said plurality of second shelf members 19. The bin 60 provides for accumulating a small storage pile of fruit pieces 66 at the intake area of the fruit feeder 14. Here, the shelf member 19a is lowered to permit individual fruit pieces 66 from the storage pile to roll into each recess 22. The fruit pieces are retained therein owing to the width and depth of the individual recesses.

Then, when next the second frame assembly 23 is raised again to its upper position, each of the individual fruit pieces present in each of the second shelf member 19 are raised up to a next higher first shelf member 16, whereupon such fruit pieces again roll or slide into adjacent recesses in such next higher first shelf member 16.

The fruit feeder 14 preferably has the uppermost shelf members 16 and plate 28 provided on a respective front face thereof with a ridge-like projection 71 between respective ones of said recesses 22 thereof. A projection 71 can be formed of metal or plastic and can be secured to its associated such first shelf member 16 or plate 28 by screws or the like. Mating grooves for receiving said respective projections are provided on the respective back faces of each one of the adjacent pair of second shelf members 19. Projections 71 aid in channeling fruit pieces into rows 15, as those skilled in the art will appreciate. The actuation means 43 is particularly well adapted for continuous feeding of fruit pieces to a stop and go type food processing machine wherein each fruit piece is delivered to a particular work station whereat machine functions are performed on such an individual fruit member.

A fruit feeder 14 preferably has each individual one of said first and said second shelf members 16 and 19 comprised of a formed metal plate which is secured to respective adjacent portions of said first and second frame means 18 and 23 by fastening means, such as nuts and bolts 92 or the like along side and bottom edges thereof.

A fruit feeder of this invention preferably has a total number of first shelf members ranging from 3 to 6 and, correspondingly, a total number of said second shelf members ranging from 4 to 7. Fruit feeder 14, a preferred embodiment, has first shelf members 16 and second shelf members 19. Preferably the total number of said rows 15 ranges from 2 to 6; the fruit feeder 14 has 4 rows 15.

Figure 3:
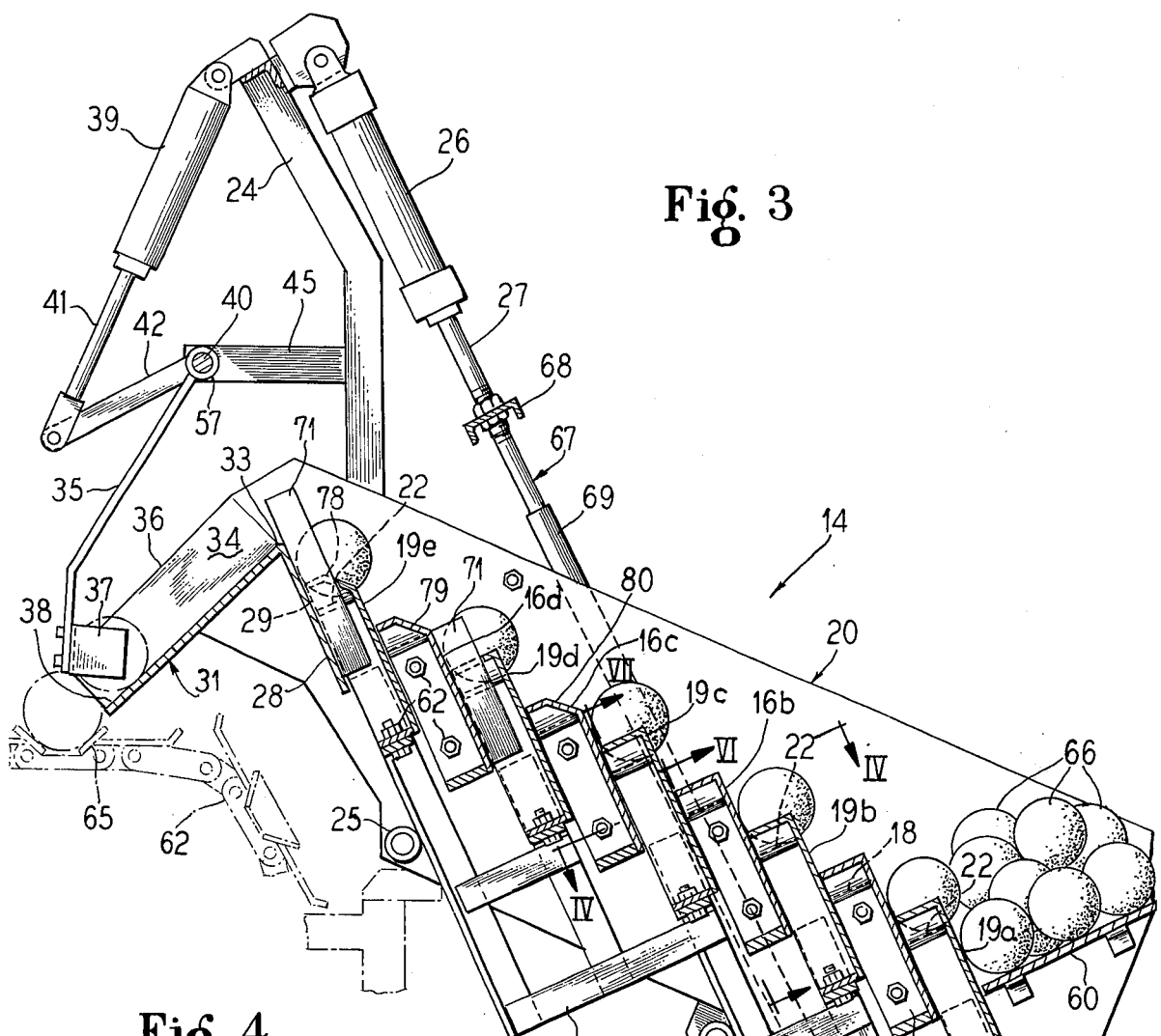
FIG. 3 is a vertical sectional view taken along the line III—III of FIG. 2, some parts thereof broken away.
Figure 4:
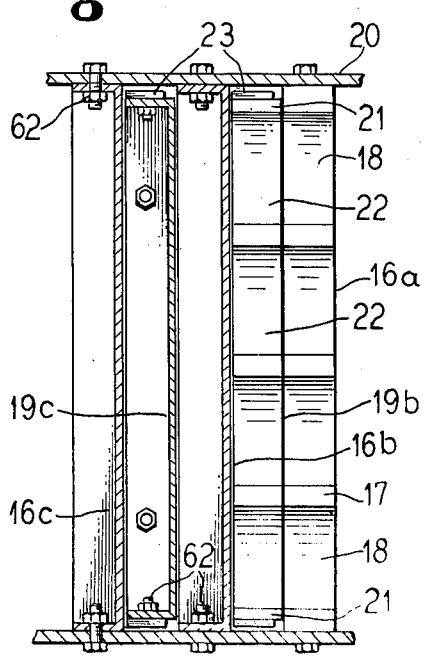
FIG. 4 is a sectional view taken along the line IV—IV of FIG. 3.

In the fruit feeder 14, preferably first cylinder 26 comprises a double acting pneumatic device having a first piston rod 27 and wherein such first piston rod 27 is so associated with said second frame 23 by a first interconnecting means designated in its entirety by the numeral 67. First interconnecting means 67 here incorporates a laterally extending cross member 68 to which is connected at a mid point thereof the first piston rod 27. A pair of longitudinally extending hanger bars 69 are provided. Each bar 69 is connected at one end thereof to a different respective end of said cross members 68 and at the opposite end thereof to a different respective opposed portion of the second frame 23. Preferably the opposite ends of cross members 68 are connected to a bottom portion of the second frame 23 generally adjacent opposed sides thereof, as shown in FIG. 3, for example, which plates the members in compression rather than tension. Each of the hanger bars 69 is terminably connected to a cross rod 23a extending laterally across second frame 23 at the bottom thereof.

Preferably, in fruit feeder 14, the first cylinder 26 has a terminal cylinder end pivotally associated with an upper end portion of support arrangement 24.

Preferably, the fruit feeder 14 has a pair of springs 72 which extend between a side wall of first frame 20 and a rod member 23 extending from hanger bars 69 to second frame 23. Springs 72 function to yieldingly bias the second frame 23 in an upper position which stabilizes feeder 14 operation and reduces the load on cylinder 26.

Preferably, the fruit feeder 14 has its uppermost three successive ones of said first and second shelf members 16 and 17 each beveled on the forward side at locations 78, 79 and 80 which are adjacent the respective upper edges 17 and 21 thereof in portions thereof intermediate between adjacent recesses 18 and 22 thereof which helps in fruit piece movement.

In the lower position, the second frame assembly 23 has lowered each of the individual second shelf members 19 to their respective lower positions so that the fruit rolls in and individual fruit pieces become lodged in each recess of the bottommost second shelf member 19a. When the second frame assembly has been raised to its upper position, the fruit pieces are raised up by shelf member 19a to the level of the lowermost first shelf member 16 where such fruit pieces, owing to the diagonal orientation of the shelf members generally, slide or roll into the adjacent recesses of such bottommost first shelf member 16a and are retained there owing to the width and depth of the individual recesses.

In feeder 14, each of the cylinders 26 and 39 is chosen so as to have the correct amount of throw. Then, the adjustment of the piston rods 27 and 41 is undertaken, along with associated components, so that one can move the frame up or down for orienting the assembled components in a desired optimum interrelationship). In some instances, as where the cylinder stroke is not compatible with the throw needed, one can insert blocks or strips inside the cylinder so that the rod does not travel quite so far, as those skilled in the art will appreciate.

In a particularly preferred embodiment of the present invention, fruit feeder 14 is provided with fluid valves 44a and 44b which are each provided with speed control valves (shown by symbols 50a and 50b in FIG. 1) which are each preferably variable (so as to permit fine tuning of operation of an individual fruit feeder 14. Such control valves 50a and 60b are conventional and are used in combination with 4-way valves. Here, such control valves 50a and 50b permit one to provide a definite dwell time for the second shelf members 19 when they are each at their top and bottom positions, respectively, in response to operation of cylinder 26, and also for the gates 37 when they are at, particularly, the respective bottom positions relative to each passageway 36 in response to operation of cylinder 39. Thus, for example, slowing the speed of reversal at the end of each upward or downward movement particularly of the second shelf members 19, which is achieved by regulating the size of the air escape restrictions in control valve 50a so as to control rate of air escape from cylinder 26 before reversal of movement of rod 27 thereof, as those skilled in the art will appreciate, the dwell time interval of the second shelf members 19 at their upper and lower positions, respectively, thereof is regulated. Such a dwell time interval has been found, surprisingly and unexpectedly, to minimize possibilities of fruit damage and to improve the ease of transferring fruit members from second shelf members 19 to first shelf members 16 during operation of fruit feeder 14. Such a dwell time characteristic can be achieved with mechanical (as opposed to pneumatic) drive linkages for a fruit feeder since mechanical drive linkages produce a species of harmonic reciprocal movement of second shelf members 19 that is undesirable by comparison to the type of reciprocal movement for members 19 achievable by the practice of the present invention, as those skilled in the art will understand.

Other and further embodiments and variations of the present invention will become apparent to those skilled in the art from a reading of the present specification taken together with the drawings and no undue limitations are to be inferred or implied from the present disclosure.

I claim:

1. A fruit feeder comprising:

A. a plurality of first shelf members in spaced, parallel relationship to one another, each individual one of such first shelf members being offset from adjacent such first shelf members so that said first plurality defines a diagonal stair-step arrangement, the upper edge of each one of such first shelf members having defined therein a plurality of laterally adjacent first recesses, such first recesses being so arranged spatially on adjacent such first shelf members that they define a plurality of longitudinally extending, laterally spaced, parallel rows thereof, B. first stationary frame means fixedly holding each individual one of said first shelf members in such spaced, parallel, diagonal relationship, C. a plurality of second shelf members in spaced, parallel, diagonal relationship to one another, one of such second shelf members being interdigitated between a different adjacent pair of said first shelf members, the upper edge of each one of such second shelf members having defined therein a plurality of laterally adjacent second recesses, such second recesses being so arranged spatially on adjacent such second shelf members that they are respectively aligned with such first recesses in such plurality of rows, such second shelf members each being slidably movable transversely relative to such first shelf members, D. second frame means fixedly holding each individual one of such second shelf members in such relationship, said second frame means being reciprocatorily movable transversely relative to said first frame means, and including bearing means, and further being adapted to slidably reciprocatorily move each one of such second shelf members an equal distance, E. support means generally upstanding in the region of the uppermost one of said first shelf members, said support means being fixedly associated with said first frame means, F. first fluid cylinder means functionally associated with said support means and having extensible and retractable first rod means terminably functionally associated with said second frame means, said first rod means being adapted during operation of said first cylinder means to reciprocatorily move said second frame means to an extent sufficient to translate the upper edge of each one of such interdigitated second shelf members between upper and lower positions of general prechosen alignment with the respective adjacent upper edges of such adjacent respective upper and lower first shelf members, said first cylinder means including first valve means for regulating ingress and egress of a cylinder operating fluid thereinto and therefrom, respectively, G. plate means fixedly associated with said first frame means and interposed slidably adjacent the back side of the uppermost one of said second shelf members, H. a raceway joined across the top edge of said plate means and downwardly inclined therefrom, including upstanding generally longitudinally extending wall members defining therebetween a plurality of passageways corresponding to the number of said rows, and being generally aligned with respective side portions thereof at said top edge, I. gate means disposable across the lower end region of said raceway, J. second fluid cylinder means functionally associated with said support means and having an extensible and retractable second rod means terminably functionally associated with said gate means for reciprocal raising and lowering of said gate means to respectively alternately open and close such lower end region, said second cylinder means including second valve means for regulating ingress and egress of a cylinder operating fluid thereinto and therefrom, respectively, and K. flow control means functionally associated with at least one of said fluid cylinder means for regulating the dwell time of the said rod means thereof at one end of such reciprocal movement thereof.

2. The fruit feeder of claim 1 further including synchronized, automatic actuation means for operating said first and said second fluid cylinder means.

3. The fruit feeder of claim 2 wherein said actuation means comprises:
   a. a pair of cams for actuating said first and said second valve means and
   b. cam operating means functionally associated with each of said cams for powering and timing movements of said cam pair.

4. The fruit feeder of claim 1 wherein bin means is functionally associated with a said lowermost one of said plurality of second shelf members, said bin means having a bottom portion which is generally inclined downwardly towards said lowermost one of said plurality of second shelf members.

5. The fruit feeder of claim 4 wherein the total number of said rows is 4.

6. The fruit feeder of claim 1 wherein the individual one of said first and second shelf members is comprised of a formed metal plate which is secured to respective adjacent portions of said first and second frame means by fastening means.

7. The fruit feeder of claim 1 wherein the total number of said first shelf members ranges from 3 to 6, and, correspondingly, the total number of said second shelf members ranges from 4 to 7.

8. The fruit feeder of claim 7 wherein the total number of said first shelf members is 4 and the total number of said second shelf members is 5.

9. The fruit feeder of claim wherein the total number of said rows ranges from 2 to 6.

10. The fruit feeder of claim 1 wherein said second cylinder means comprises a single double acting pneumatic device having a single second rod means and wherein said second rod means is so associated with said arm members by second interconnecting means, said second interconnecting means comprising:
   a. a laterally extending pivot rod including bearing means therefor, said pivot rod being functionally associated with said support means above said top edge,
   b. lever arm means, one end of which is functionally secured to said pivot rod, the other end of which projects outwardly from said pivot rod,
   c. said arm members being functionally terminally journaled relative to said pivot rod, and
   d. said second rod member is terminally functionally associated with said other end of said lever arm means, whereby said plurality of gate members are arcuately so raised and lowered.

11. The fruit feeder of claim 1 wherein said first cylinder means comprises a single double acting pneumatic device having a single first rod means and wherein said first rod means is so associated with said second frame means by first interconnecting means, said first interconnecting means comprising:
   a. a laterally extending cross bar to which is connected at a mid point thereof said first rod member, and
   b. a pair of longitudinally extending hanger bar means each one of which is connected at one end thereof to a different respective end of said cross bar and at the opposite end thereof to a different respective opposed portion of said second frame means.

12. The fruit feeder of claim 11 wherein said opposite ends are so connected to a bottom portion of said second frame means generally adjacent opposed sides thereof.

13. The fruit feeder of claim 1 wherein spring means yieldingly bias said second frame means in an upper position.

14. The fruit feeder of claim 1 wherein said first fluid cylinder means has a cylinder end pivotally associated with an upper end portion of said support arrangement.

15. The fruit feeder of claim 1 wherein the uppermost first shelf member and also said plate means are each provided on each respective front face thereof with a plurality of ridge-like projections each one of which is located between a different respective one of said recesses relative to said uppermost shelf member, and wherein mating grooves for receiving each one of said respective projections are provided on the respective back faces of each of the adjacent pair of said second shelf members.

16. The fruit feeder of claim 15 wherein the uppermost three successive ones of said first and second shelf members are each beveled on the forward side thereof adjacent the respective said upper edges thereof in portions thereof intermediate between adjacent recesses thereof.

17. The fruit feeder of claim 1 wherein said gate means comprises a plurality of individual members each disposed across the lower mouth region of a different one of said passageways, and each being secured to a separate arm member which is functionally associated with said second rod means for reciprocal raising and lowering of said individual members of said plurality to open and close alternately such passageways.

* * * * *